United States Patent
Matsumoto et al.

(10) Patent No.: US 11,652,361 B1
(45) Date of Patent: May 16, 2023

(54) POWER SUPPLY APPARATUS AND INSPECTION METHOD

(71) Applicant: DENSO TEN Limited, Kobe (JP)

(72) Inventors: Takeshi Matsumoto, Kobe (JP); Daiki Hakushima, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 17/698,682

(22) Filed: Mar. 18, 2022

(30) Foreign Application Priority Data

Nov. 15, 2021 (JP) .............................. JP2021-185688

(51) Int. Cl.
| | |
|---|---|
| *H02J 9/06* | (2006.01) |
| *B60L 3/00* | (2019.01) |
| *B60R 16/03* | (2006.01) |
| *B60R 16/033* | (2006.01) |
| *B60L 1/00* | (2006.01) |
| *B60L 53/20* | (2019.01) |

(52) U.S. Cl.
CPC ............... *H02J 9/061* (2013.01); *B60L 1/00* (2013.01); *B60L 3/003* (2013.01); *B60R 16/03* (2013.01); *B60R 16/033* (2013.01); *H02J 9/068* (2020.01); *B60L 53/20* (2019.02); *B60L 2210/10* (2013.01)

(58) Field of Classification Search
CPC ....... B60R 16/033; B60R 16/02; B60R 16/03; H02J 9/061; H02J 7/34; H02J 1/10; H02J 7/0031; H02J 9/068; H02J 7/0029; H02J 7/0047; H02J 7/14; H02J 7/1461; B60L 1/00; B60L 3/00; B60L 3/04; B60L 2210/10; B60L 53/20
See application file for complete search history.

(56) References Cited

U.S. PATENT DOCUMENTS

2018/0219407 A1* 8/2018 Nakamura ................ H02J 1/08

FOREIGN PATENT DOCUMENTS

JP 2020-156228 A 9/2020

* cited by examiner

*Primary Examiner* — Ryan Johnson
(74) *Attorney, Agent, or Firm* — Oliff PLC

(57) ABSTRACT

A power supply apparatus includes: a first system configured to supply electric power of a first power supply to a first load; a second system configured to supply electric power of a second power supply to a second load; a connection unit capable of connecting and disconnecting the first system and the second system; a second system switch capable of connecting the second power supply to the second system; and an inspection unit configured to perform inspection as to whether electric power is capable of being supplied from the second power supply to the second load, and, when a voltage of the second power supply is not equal to a voltage of the first power supply, the inspection unit controls the first power supply as defined herein and conducts the second system switch to perform the inspection by stepping down or up the voltage of the first power supply.

7 Claims, 16 Drawing Sheets

(CONT.)

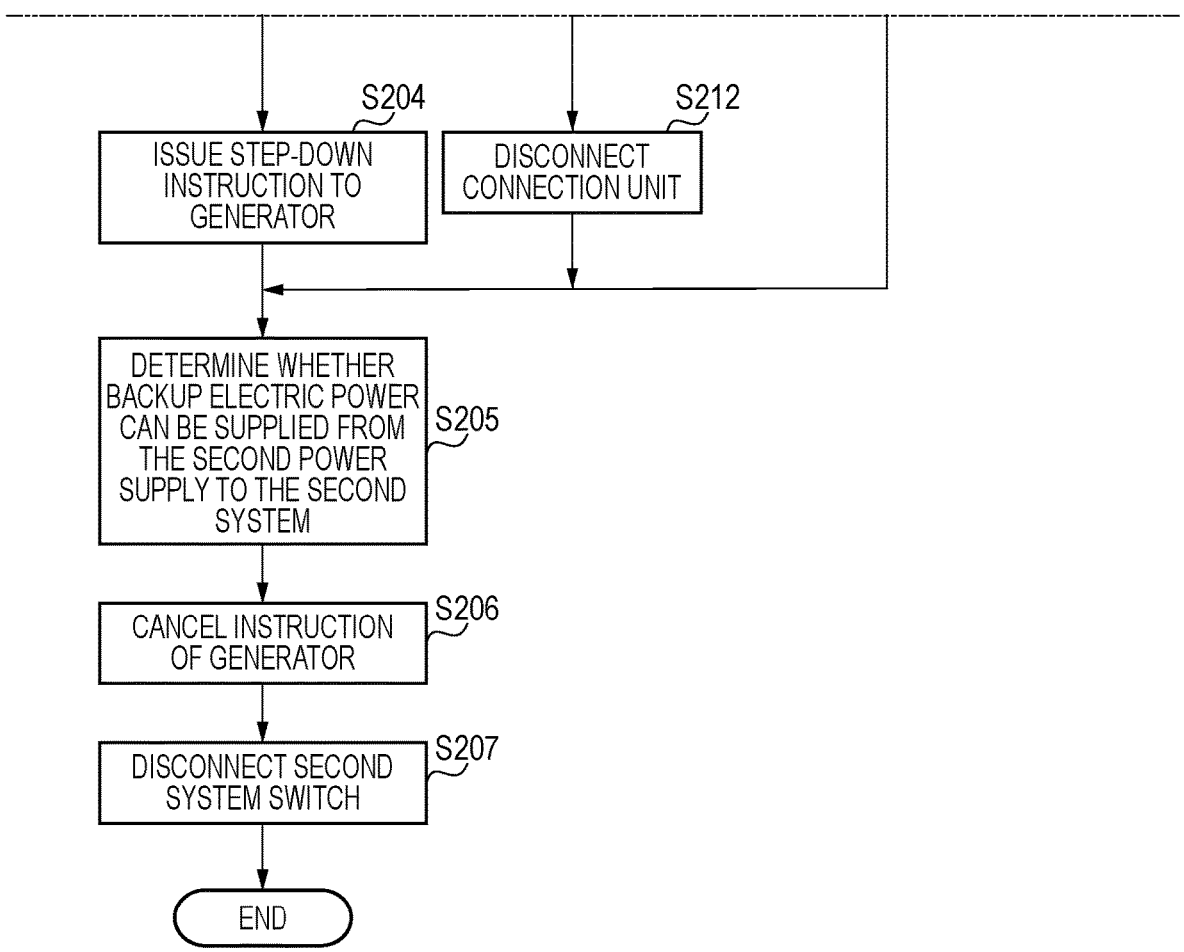

POWER SUPPLY APPARATUS AND INSPECTION METHOD

CROSS-REFERENCE TO RELATED APPLICATION

This application is based on and claims priority under 35 USC 119 from Japanese Patent Application No. 2021-185688 filed on Nov. 15, 2021.

TECHNICAL FIELD

The disclosed embodiment relates to a power supply apparatus and an inspection method.

BACKGROUND ART

A battery control device that backs up a first power supply serving as a main battery with a second power supply serving as a sub-battery when an abnormality occurs in the first power supply is known (see, for example, JP-A-2020-156228). Such a battery control device needs to inspect whether the backup performed by the second power supply is possible, that is, whether electric power can be supplied from the second power supply to a load to which the electric power is to be supplied.

SUMMARY OF INVENTION

However, when it is inspected whether the backup can be performed by the second power supply, if a discharge amount of the second power supply is large, there is a problem that deterioration of the second power supply progresses.

An aspect of the embodiment has been made in view of the above circumstances, and an object thereof is to provide a power supply apparatus and an inspection method capable of inspecting whether the backup performed by the second power supply is possible while preventing deterioration of the second power supply.

A power supply apparatus according to an aspect of the embodiment includes a first system, a second system, a connection unit (a connector), a second system switch, and an inspection unit (at least one processor). The first system supplies electric power of a first power supply to a first load. The second system supplies electric power of a second power supply to a second load. The connection unit can connect and disconnect the first system and the second system. The second system switch can connect the second power supply to the second system. The inspection unit performs inspection as to whether electric power can be supplied from the second power supply to the second load. When a voltage of the second power supply is not equal to a voltage of the first power supply, the inspection unit controls the first power supply so that the voltage of the first power supply becomes equal to the voltage of the second power supply, and then conducts the second system switch to perform the inspection by stepping down or stepping up the voltage of the first power supply.

The power supply apparatus and the inspection method according to one aspect of the embodiment have an effect of being capable of inspecting whether backup performed by the second power supply is possible while preventing deterioration of the second power supply.

DETAILED DESCRIPTION OF THE INVENTION

Hereinafter, an embodiment of a power supply apparatus and a power supply control method will be described in detail with reference to the accompanying drawings. The present invention is not limited to the following embodiments. Hereinafter, a power supply apparatus mounted on a vehicle that has an automated driving function and supplying electric power to a load will be described as an example, but the power supply apparatus according to the embodiment may be mounted on a vehicle that does not have the automated driving function.

The power supply apparatus according to the embodiment is mounted on an electric vehicle, a hybrid vehicle, or an engine vehicle driven by an internal combustion engine. The power supply apparatus according to the embodiment includes a first power supply and a second power supply. When a power supply failure occurs in the first power supply, the power supply apparatus may be mounted on any apparatus that backs up the first power supply by the second power supply and performs FOP (fail operation).

[1. Configuration of Power Supply Apparatus]

Figure 1:
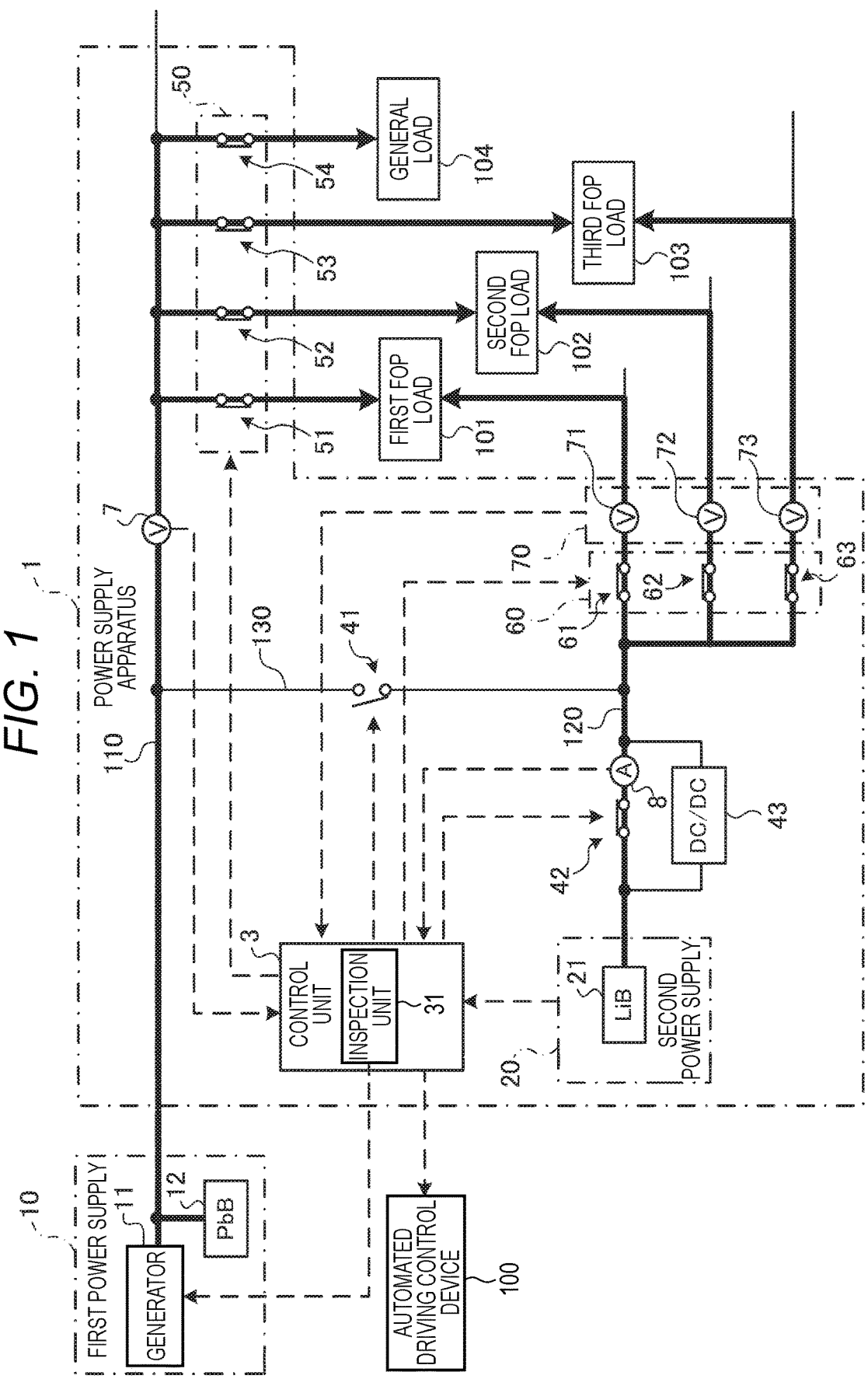
FIG. 1 is an illustrative diagram illustrating a configuration example of a power supply apparatus according to an embodiment.

FIG. 1 is an illustrative diagram illustrating a configuration example of the power supply apparatus according to the embodiment. As illustrated in FIG. 1, a power supply apparatus 1 according to the embodiment is connected to a first power supply 10 and an automated driving control device 100. Further, the power supply apparatus 1 is connected to a first FOP load 101, a second FOP load 102, a third FOP load 103, and a general load 104, which are examples of a first load, and is connected to the first FOP load 101, the second FOP load 102, and the third FOP load 103, which are examples of a second load.

The power supply apparatus 1 includes a first system 110 and a second system 120. The first system 110 supplies electric power of the first power supply 10 to the first FOP load 101, the second FOP load 102, the third FOP load 103, and the general load 104, which are examples of the first load, via a first connection device 50.

The first connection device 50 includes switches 51, 52, 53, 54. The switch 51 can connect and disconnect the first system 110 and the first FOP load 101. The switch 52 can connect and disconnect the first system 110 and the second FOP load 102. The switch 53 can connect and disconnect the first system 110 and the third FOP load 103. The switch 54 can connect and disconnect the first system 110 and the general load 104.

The second system 120 supplies electric power of the second power supply 20, which will be described later, to the first FOP load 101, the second FOP load 102, and the third FOP load 103, which are examples of the second load, via a second connection device 60. The second connection device 60 includes switches 61, 62, 63. The switch 61 can connect and disconnect the second system 120 and the first FOP load 101. The switch 62 can connect and disconnect the second system 120 and the second FOP load 102. The switch 63 can connect and disconnect the second system 120 and the third FOP load 103.

The first FOP load 101, the second FOP load 102, and the third FOP load 103 are loads for automated driving. For example, the first FOP load 101, the second FOP load 102, and the third FOP load 103 may be a steering motor, an electric brake device, an in-vehicle camera, a radar, and the like that operate during the automated driving. The general load 104 includes, for example, a display, an air conditioner, an audio, a video, and various kinds of lights.

The first FOP load 101, the second FOP load 102, the third FOP load 103, and the general load 104 are operated by electric power supplied from the power supply apparatus 1. The automated driving control device 100 is a device that controls automated driving of the vehicle by operating the first FOP load 101, the second FOP load 102, and the third FOP load 103.

When the power supply apparatus 1 is mounted on the engine vehicle, the first power supply 10 includes a generator 11 and a lead battery (hereinafter, referred to as a "PbB 12"). A battery of the first power supply 10 may be any secondary battery other than the PbB 12.

The generator 11 is, for example, an alternator that converts kinetic energy of a traveling vehicle into electricity to generate electricity. The generator 11 charges the PbB 12 and the second power supply 20 with the generated electric power, and supplies the electric power to the first FOP load 101, the second FOP load 102, the third FOP load 103, and the general load 104.

When the power supply apparatus 1 is mounted on the electric vehicle or the hybrid vehicle, the first power supply 10 includes a DC/DC converter (hereinafter, referred to as "DC/DC") and the PbB 12. In this case, the DC/DC is connected to a generator and a high-voltage battery having a voltage higher than that of the PbB 12, steps down the voltages of the generator and the high-voltage battery, and outputs the stepped-down voltages to the first system 110. The generator is, for example, the alternator. The high-voltage battery is, for example, a battery for driving a vehicle mounted on the electric vehicle or the hybrid vehicle.

The power supply apparatus 1 includes the second power supply 20, a connection unit 41, a second system switch 42, a DC/DC converter (hereinafter referred to as "DC/DC 43"), a control unit 3, a first voltage sensor 7, a second voltage sensor 70, and a current sensor 8. The second power supply 20 is a backup power supply for a case where the electric power cannot be supplied by the first power supply 10.

The second power supply 20 includes a lithium ion battery (hereinafter, referred to as a "LiB 21"). A battery of the second power supply 20 may be any secondary battery other than the LiB 21. The second power supply 20 includes a temperature sensor, a voltage sensor, and a current sensor (not shown). The temperature sensor detects a temperature of the LiB 21 and outputs the temperature to the control unit 3. The voltage sensor detects a voltage of the LiB 21 and outputs the voltage to the control unit 3. The current sensor detects a current output from the LiB 21 and a current input to the LiB 21, and outputs the detected currents to the control unit 3.

The connection unit 41 is a switch provided in an inter-system line 130 that connects the first system 110 and the second system 120, and capable of connecting and disconnecting the first system 110 and the second system 120. The second system switch 42 is a switch capable of connecting and disconnecting the second power supply 20 to and from the second system 120. The DC/DC 43 is connected in parallel with the second system switch 42, and adjusts the voltage output from the LiB 21 and a voltage input to the LiB 21.

The first voltage sensor 7 is provided in the first system 110, detects a voltage of the first system 110, and outputs a detection result to the control unit 3. The second voltage sensor 70 is provided in the second system 120, detects a voltage of the second system 120, and outputs a detection result to the control unit 3.

Specifically, the second voltage sensor 70 includes voltage sensors 71, 72, 73. The voltage sensor 71 detects a voltage applied from the second system 120 to the first FOP load 101, and outputs a detection result to the control unit 3. The voltage sensor 72 detects a voltage applied from the second system 120 to the second FOP load 102, and outputs a detection result to the control unit 3.

The voltage sensor 73 detects a voltage applied from the second system 120 to the third FOP load 103, and outputs a detection result to the control unit 3. The current sensor 8 detects a current flowing through the second system 120, and outputs a detection result to the control unit 3.

The voltage sensor 70 may be a single voltage sensor instead of being provided with the voltage sensors for the respective first to third FOP loads 101 to 103. In this case, the voltage sensor 70 may be provided between a point at which the second system 120 branches to the first to third FOP loads 101 to 103 and a connection point between the second system 120 and the inter-system line 130.

The control unit 3 includes a microcomputer having a central processing unit (CPU), a read only memory (ROM), a random access memory (RAM), and the like, and various circuits. The control unit 3 may be configured with hardware such as an application specific integrated circuit (ASIC) or a field programmable gate array (FPGA).

The control unit 3 includes an inspection unit 31 that functions by the CPU executing a program stored in the ROM using the RAM as a work area, and controls operations of the power supply apparatus 1. When the power supply apparatus 1 is in normal operation, the control unit 3 brings the switches 51, 52, 53, 54, 61, 62, 63 into a conductive state.

The control unit 3 detects a ground fault of the first system 110 or the second system 120 based on the detection results received from the first voltage sensor 7 and the second voltage sensor 70. A specific example of a method for detecting the ground fault by the control unit 3 will be described later.

When the ground fault of the first system 110 or the second system 120 is detected, the control unit 3 notifies the automated driving control device 100 of the fact. When the ground fault of the first system 110 or the second system 120 is detected, the control unit 3 may notify the automated driving control device 100 of a fact that the automated driving is impossible. When the ground fault of the first system 110 or the second system 120 is not detected, the control unit 3 may notify the automated driving control device 100 of a fact that the automated driving is possible.

When the ground fault occurs in the first system 110, the control unit 3 disconnects the connection unit 41, conducts the second system switch 42, and supplies electric power from the second power supply 20 to the first FOP load 101, the second FOP load 102, and the third FOP load 103.

When the ground fault occurs in the second system 120, the control unit 3 disconnects the connection unit 41, and supplies electric power from the first power supply 10 to the first FOP load 101, the second FOP load 102, the third FOP load 103, and the general load 104 in a state where the second system switch 42 is disconnected.

Accordingly, even if one of the systems has a ground fault during the automated driving, the power supply apparatus 1 can use the other system, cause the vehicle to perform limp-home traveling to a safe place by the automated driving control device 100, and stop the vehicle.

As described above, when an abnormality occurs in the first power supply 10, the control unit 3 performs backup by the second power supply 20, but, for example, when the second system switch 42 is fixed to an off-state, the backup cannot be performed normally.

Therefore, the control unit 3 needs to determine whether the backup can be performed by the second power supply 20 (hereinafter, may be referred to as "backup availability determination"). Here, for example, immediately after an ignition switch (IG) is turned on or during a stop of a vehicle waiting for a traffic light, a general control unit turns on the second system switch 42 to supply electric power from the second power supply 20 to the second system 120, and performs the backup availability determination.

Then, the control unit determines that the backup can be performed when electric power is normally supplied from the second power supply 20 to the second system 120, and determines that the backup cannot be performed when electric power is not supplied from the second power supply 20 to the second system 120. However, when it is inspected whether the backup can be performed by the second power supply 20, if a discharge amount of the second power supply 20 is large, there is a problem that deterioration of the LiB 21 in the second power supply 20 progresses.

Therefore, the control unit 3 according to the embodiment includes the inspection unit 31 that inspects whether electric power can be supplied from the second power supply 20 to the first FOP load 101, the second FOP load 102, and the third FOP load 103, which are examples of the second load, and prevents the deterioration of the second power supply 20.

When a voltage of the first power supply 10 is not equal to a voltage of the second power supply 20, the inspection unit 31 controls the first power supply 10 so that the voltage of the first power supply 10 becomes equal to the voltage of the second power supply 20, and then conducts the second system switch 42 to perform the inspection by stepping down or stepping up the voltage of the first power supply 10. At this time, the inspection unit 31 steps up or steps down the voltage of the first power supply 10 by controlling the generator 11 of the first power supply 10.

When a minimum necessary current discharged from the second power supply 20 is detected by the current sensor 8 immediately after the voltage of the first power supply 10 equal to the voltage of the second power supply 20 is stepped down, the inspection unit 31 determines that the second system switch 42 is not fixed to the off-state and the backup can be performed.

Further, when the current sensor 8 does not detect a current discharged from the second power supply 20 immediately after the voltage of the first power supply 10 equal to the voltage of the second power supply 20 is stepped down, the inspection unit 31 can determine that the second system switch 42 is fixed to the off-state and the backup cannot be performed.

In this manner, since the inspection unit 31 performs the inspection of the backup availability determination by discharging the minimum necessary current from the second power supply 20, it is possible to perform the inspection as to whether electric power can be supplied from the second power supply 20 to the second system 120 while preventing the deterioration of the second power supply 20.

In addition, when a minimum necessary current charged to the second power supply 20 is detected by the current sensor 8 immediately after the voltage of the first power supply 10 equal to the voltage of the second power supply 20 is stepped up, the inspection unit 31 determines that the second system switch 42 is not fixed to the off-state and the backup can be performed.

Further, when the current sensor 8 does not a current charged to the second power supply 20 immediately after the voltage of the first power supply 10 equal to the voltage of the second power supply 20 is stepped up, the inspection unit 31 determines that the second system switch 42 is fixed to the off-state and the backup cannot be performed.

In this manner, since the inspection unit 31 performs the inspection of the backup availability determination by charging the minimum necessary current to the second power supply 20, it is possible to perform the inspection as to whether electric power can be supplied from the second power supply 20 to the second system 120 while preventing the deterioration of the second power supply 20.

When the voltage of the first power supply 10 is equal to the voltage of the second power supply 20, the inspection unit 31 steps down or steps up the voltage of the first power supply 10 to inspect whether electric power can be supplied from the second power supply 20 to the second system 120.

Accordingly, the inspection unit 31 can perform the inspection of the backup availability determination by discharging the minimum necessary current from the second power supply 20 or charging the second power supply 20 with the minimum necessary current. Therefore, the inspection unit 31 can perform the inspection as to whether electric power can be supplied from the second power supply 20 to the second system 120 while preventing the deterioration of the second power supply 20.

The generator 11 can step up the voltage of the first power supply 10 to a voltage higher than the voltage of the PbB 12, but cannot step down the voltage of the first power supply 10 to a voltage lower than the voltage of the PbB 12 even when a power generation operation is stopped.

Therefore, when the voltage of the first power supply 10 and the voltage of the second power supply 20 cannot be equal to each other, the inspection unit 31 disconnects the connection unit 41, conducts the second system switch 42, and inspects whether electric power can be supplied from the second power supply 20 to the second system 120.

Accordingly, even when the voltage of the first power supply 10 and the voltage of the second power supply 20 cannot be equal to each other, the inspection unit 31 can inspect whether electric power can be supplied from the second power supply 20 to the second system 120.

Figure 2:
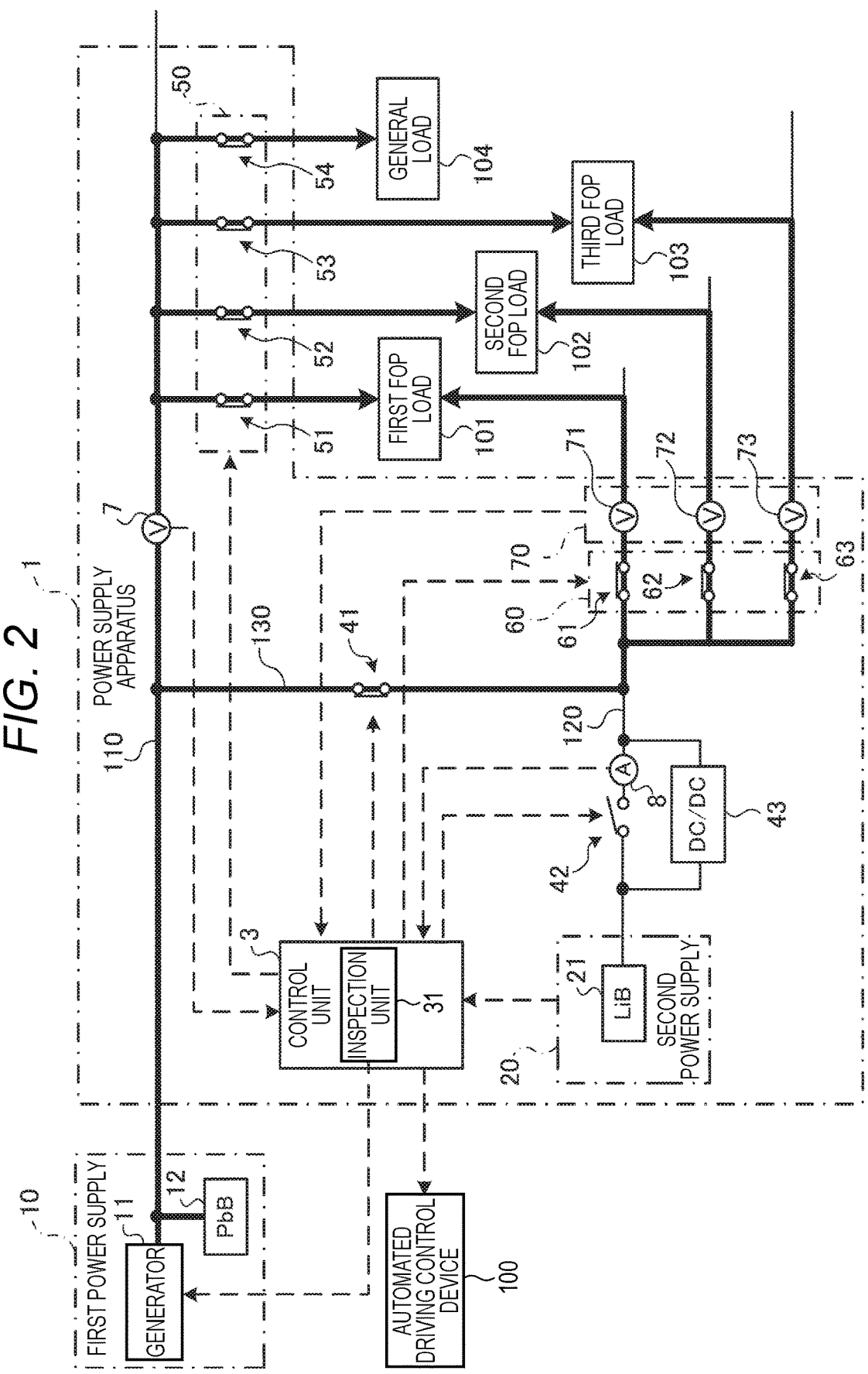
FIG. 2 is an illustrative diagram illustrating an operation example of the power supply apparatus according to the embodiment.

[2. Normal Operation of Power Supply Apparatus] In normal operation in which no ground fault occurs in the first system 110 and the second system 120, as illustrated in FIG. 2, the control unit 3 conducts all the switches 51, 52, 53, 54 of the first connection device 50 and all the switches 61, 62, 63 of the second connection device 60. The control unit 3 conducts the connection unit 41 in the state where the second system switch 42 is disconnected, and supplies electric power from the first power supply 10 to the first FOP load 101, the second FOP load 102, the third FOP load 103, and the general load 104. At this time, the control unit 3 stops operations of the DC/DC 43.

[3. Operation of Power Supply Apparatus when Ground Fault Occurs]

Figure 3:
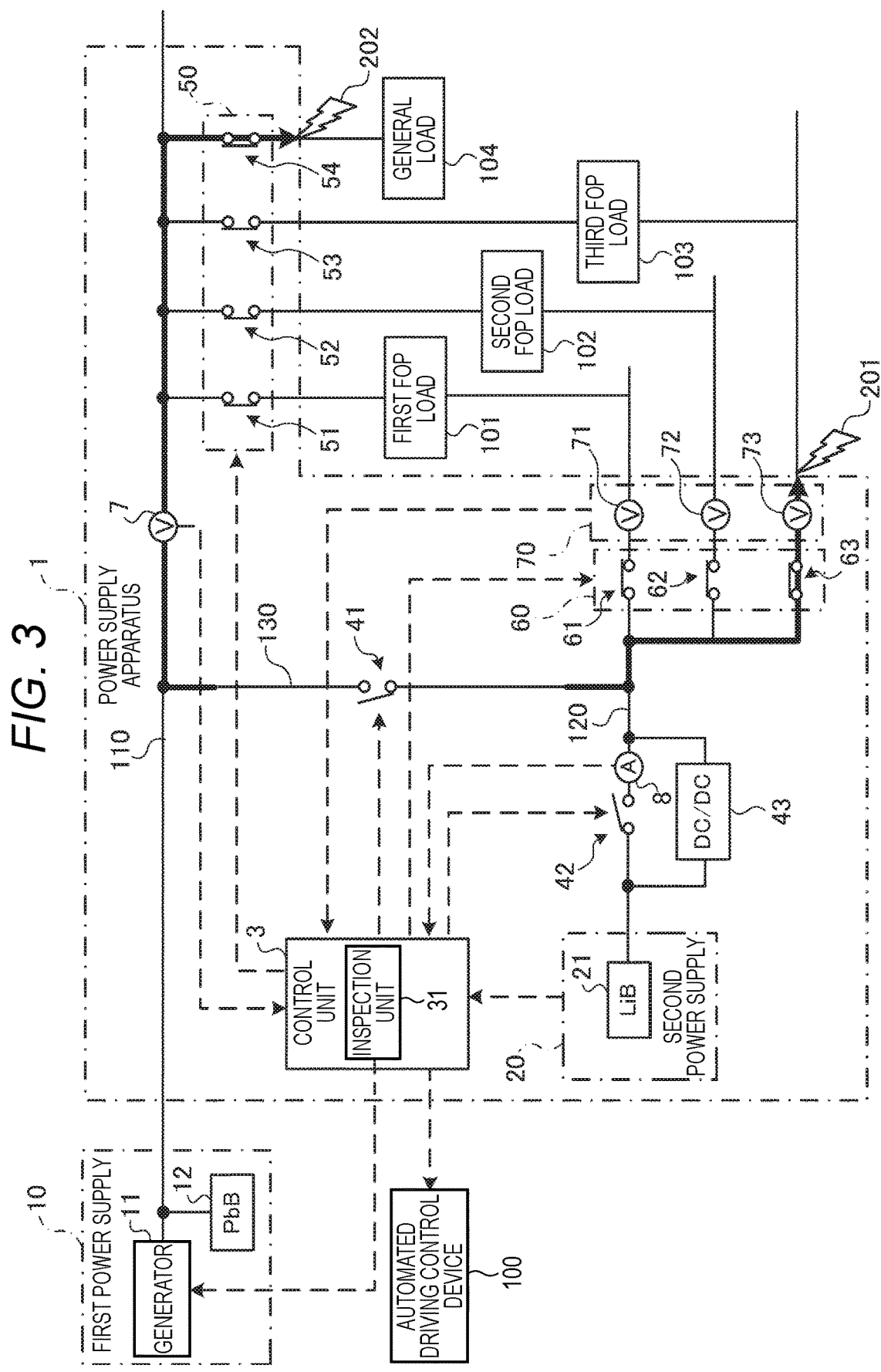
FIG. 3 is an illustrative diagram illustrating an operation example of the power supply apparatus according to the embodiment.

Next, an operation of the power supply apparatus 1 when a ground fault occurs will be described with reference to FIGS. 3 to 5. As illustrated in FIG. 3, in the power supply apparatus 1, for example, when a ground fault 202 occurs in the first system 110, an overcurrent flows toward a ground fault point, and thus the voltage of the first system 110 detected by the first voltage sensor 7 become equal to or less than a ground fault threshold.

In the power supply apparatus 1, when a ground fault 201 occurs in the second system 120 (for example, the second system 120 connected to the third FOP load 103), an overcurrent flows toward a ground fault point. Therefore, the voltage of the second system 120 detected by the second voltage sensor 70 becomes equal to or less than the ground fault threshold.

Therefore, when the voltage detected by at least one of the first voltage sensor 7 and the second voltage sensor 70 becomes equal to or less than the ground fault threshold, the control unit 3 detects an abnormality of the power supply, disconnects the connection unit 41, and conducts the second system switch 42 to be in a pre-disconnected state. At this time, the control unit 3 temporarily determines that a ground fault has occurred in the first system 110 or the second system 120.

Thereafter, after the control unit 3 temporarily determines that the ground fault has occurred in the first system 110 or the second system 120, when the voltage detected by the second voltage sensor 70 is equal to or less than the ground fault threshold, and the voltage detected by the first voltage sensor 7 returns to a value exceeding the ground fault threshold within a predetermined time, the control unit 3 determines that the ground fault 201 occurs in the second system 120.

Figure 4:
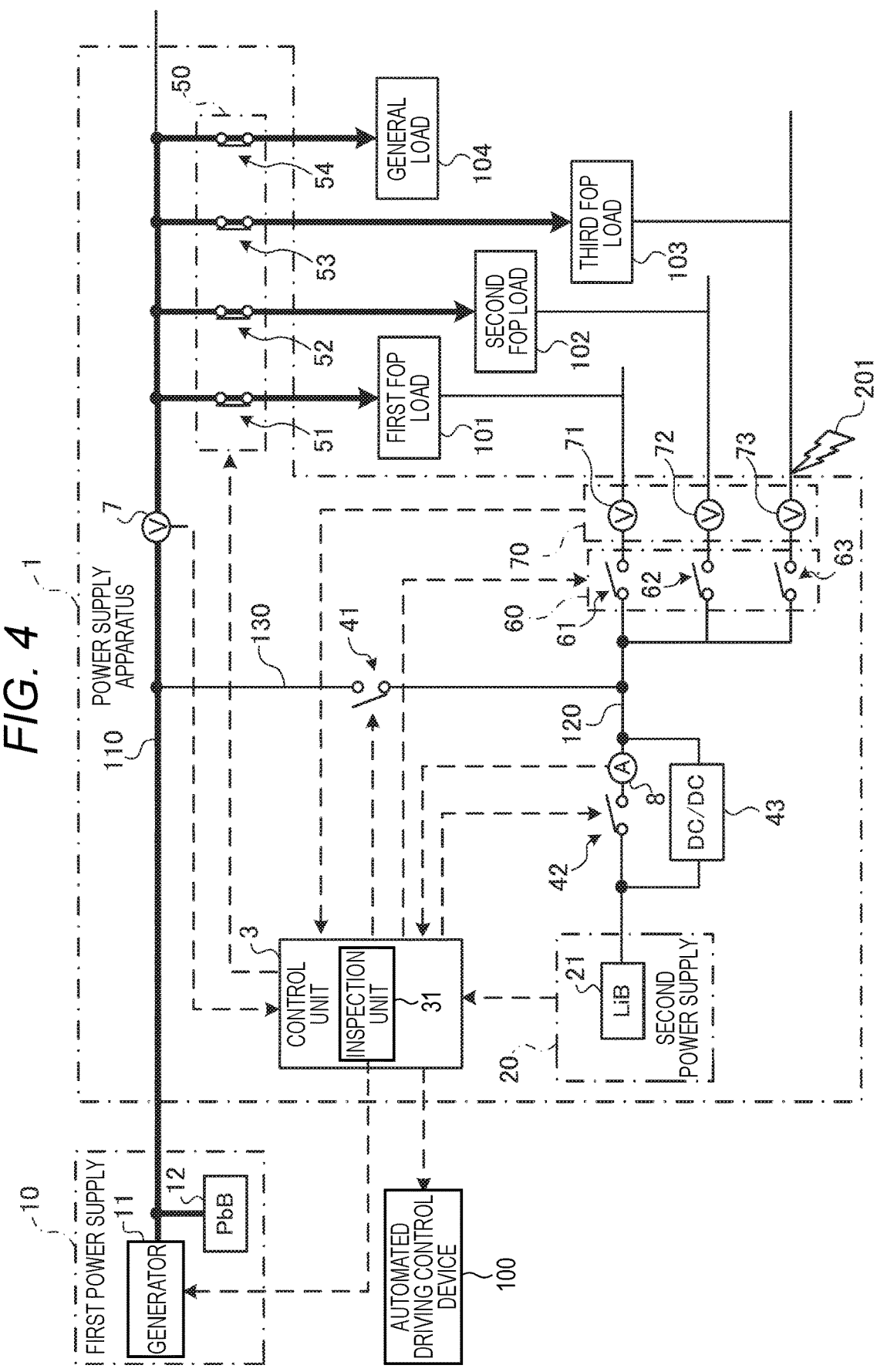
FIG. 4 is an illustrative diagram illustrating an operation example of the power supply apparatus according to the embodiment.

Then, as illustrated in FIG. 4, the control unit 3 disconnects the second system switch 42, and disconnects all the switches 61, 62, 63 of the second connection device 60 to bring the second connection device 60 into a final disconnected state. Then, the control unit 3 supplies electric power from the first power supply 10 to the first FOP load 101, the second FOP load 102, the third FOP load 103, and the general load 104, and notifies the automated driving control device 100 of the fact.

Accordingly, the automated driving control device 100 can operate the first FOP load 101, the second FOP load 102, the third FOP load 103, and the general load 104 by the electric power supplied from the first power supply 10 to cause the vehicle to perform the limp-home traveling to a safe place and stop the vehicle.

Further, after the control unit 3 temporarily determines that the ground fault has occurred in the first system 110 or the second system 120, when the voltage detected by the first voltage sensor 7 is equal to or less than the ground fault threshold for the predetermined time or longer, and the voltage detected by the second voltage sensor 70 returns to a value exceeding the ground fault threshold within the predetermined time, the control unit 3 determines that the ground fault 202 occurs in the first system 110.

Figure 5:
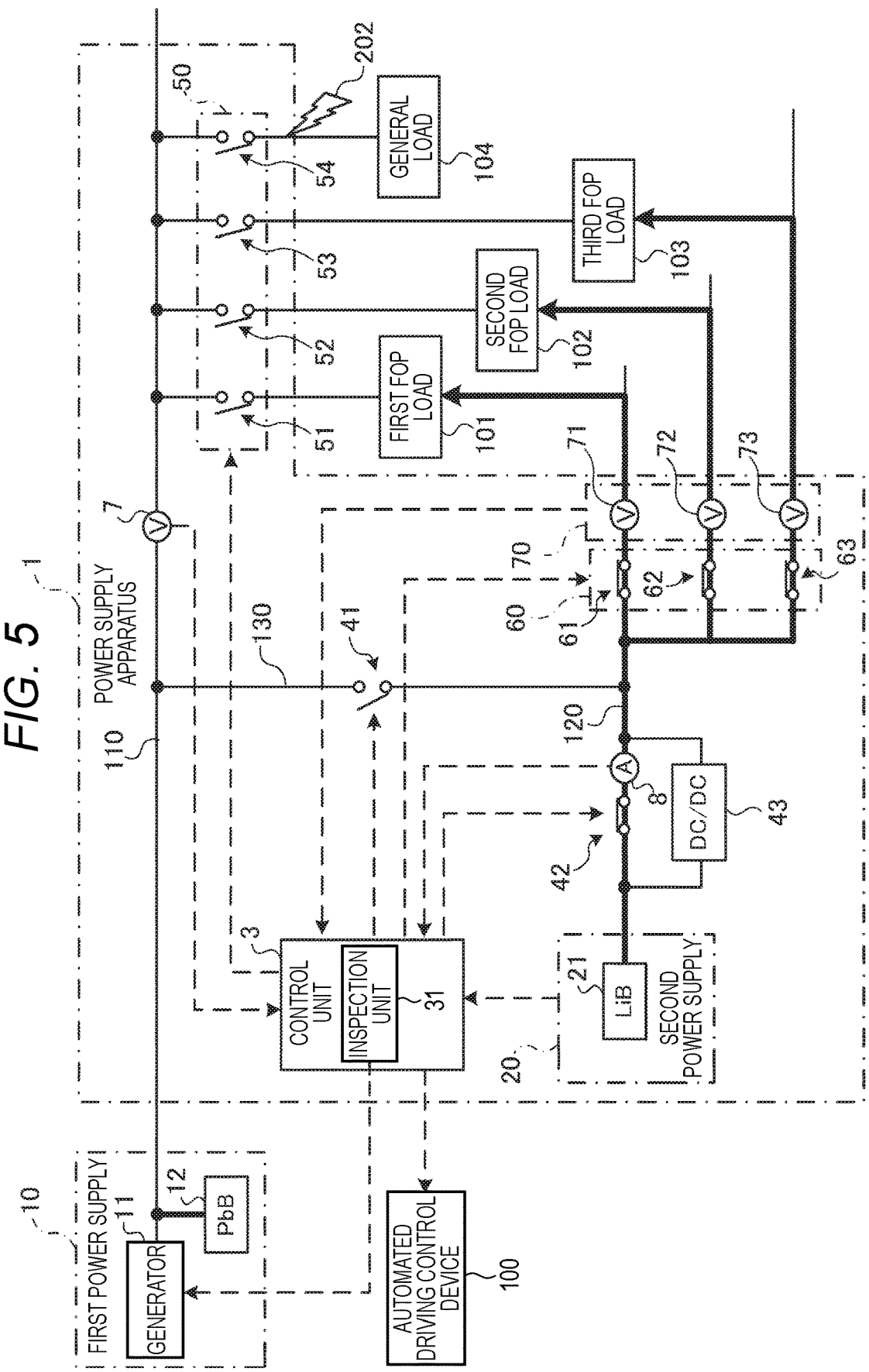
FIG. 5 is an illustrative diagram illustrating an operation example of the power supply apparatus according to the embodiment.

Thereafter, as illustrated in FIG. 5, the control unit 3 disconnects all the switches 51, 52, 53, 54 of the first connection device 50 to bring the first connection device 50 into the final disconnected state, and supplies electric power from the second power supply 20 to the first FOP load 101, the second FOP load 102, and the third FOP load 103. Then, the control unit 3 notifies the automated driving control device 100 of the fact.

Accordingly, the automated driving control device 100 can operate the first FOP load 101, the second FOP load 102, and the third FOP load 103 by the electric power supplied from the second power supply 20 to cause the vehicle to perform the limp-home traveling to a safe place and stop the vehicle.

Further, in the power supply apparatus 1, when the first FOP load 101, the second FOP load 102, the third FOP load 103, or the general load 104, not the ground fault 201 or 202, temporarily becomes an overload state, the voltages detected by the first voltage sensor 7 and the second voltage sensor 70 may temporarily become equal to or less than the ground fault threshold.

In this case, the power supply apparatus 1 disconnects the connection unit 41, conducts the second system switch 42 to be in a temporary disconnected state, and continuously supplies electric power from the first power supply 10 and the second power supply 20 to the first FOP load 101, the second FOP load 102, the third FOP load 103, and the general load 104.

After it is temporarily determined that the ground fault occurs in the first system 110 or the second system 120, if the voltages detected by the first voltage sensor 7 and the second voltage sensor 70 both return to values exceeding the ground fault threshold before the predetermined time elapses, the control unit 3 determines that there is no abnormality in the power supplies. Thereafter, in order to return the power supply apparatus 1 to the normal operation illustrated in FIG. 2, the control unit 3 disconnects the second system switch 42 and conducts the connection unit 41 again.

[4. Inspection of Second System According to Comparative Example]

Figure 6:
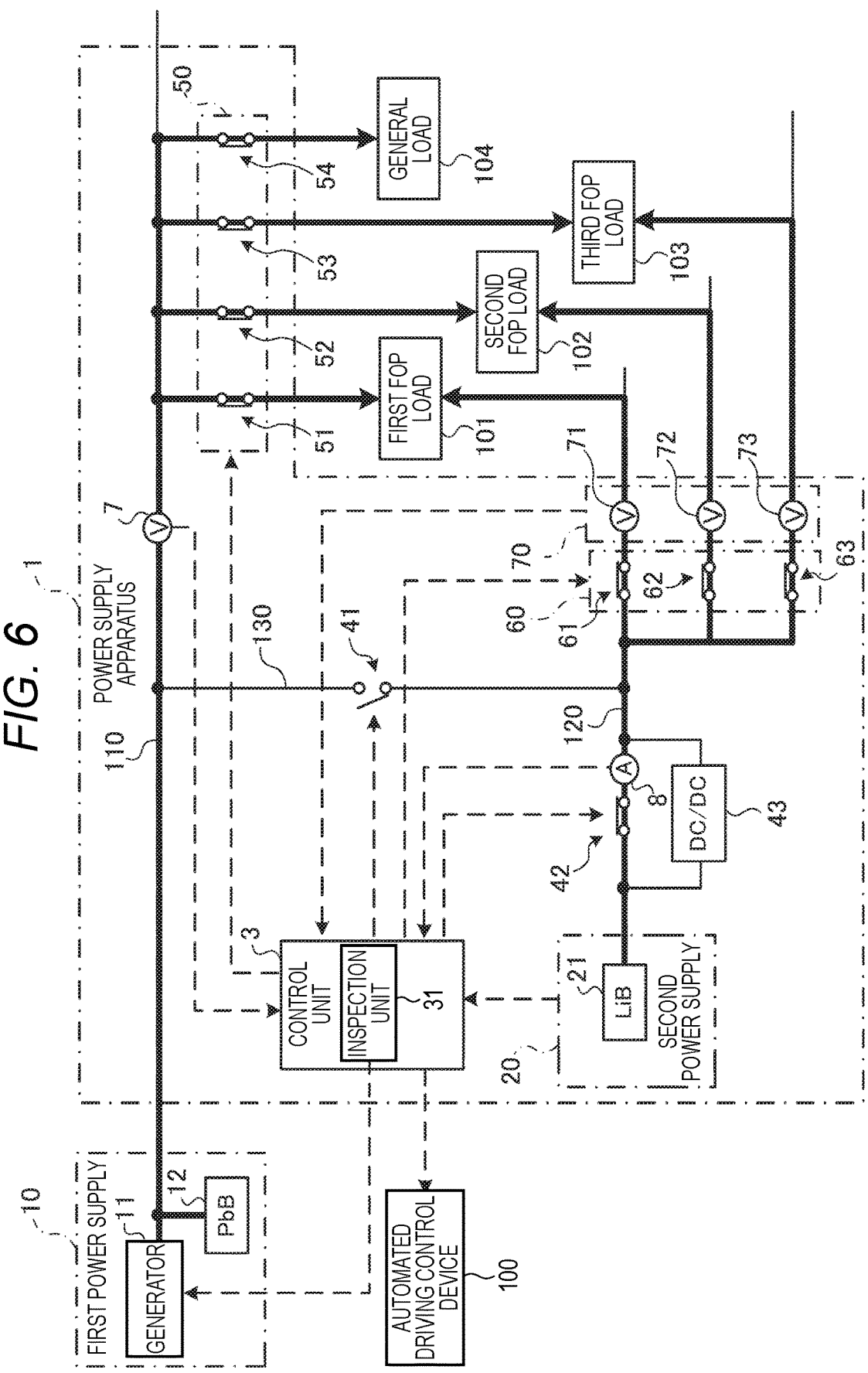
FIG. 6 is an illustrative diagram illustrating an operation example of the power supply apparatus according to a comparative example.

In addition, the power supply apparatus 1 performs operation confirmation of the second system 120 at a timing at which the operation confirmation does not interfere with the automated driving, for example, at the time of activation or at the time of stopping. Here, for example, as illustrated in FIG. 6, as an inspection method of the second system 120 according to a comparative example, there is a method of performing inspection by disconnecting the connection unit 41 during the normal operation.

In the inspection method according to the comparative example, when a current is detected by the current sensor 8 after the connection unit 41 is disconnected, it can be determined that the second system 120 is normal since electric power is supplied from the second power supply 20 to the second system 120. In addition, in the inspection method according to the comparative example, when no current is detected by the current sensor 8 after the connection unit 41 is disconnected, it can be determined that an abnormality occurs in the second system 120 since no electric power is supplied from the second power supply 20 to the second system 120.

However, in the inspection method according to the comparative example, since a current corresponding to the voltage of the second power supply 20 flows as an inspection current, the discharge amount inevitably increases. When the discharge amount of the second power supply 20 is large, the deterioration of the second power supply 20 progresses. Therefore, in the inspection method according to the embodiment, whether the backup can be by the second power supply 20 is inspected while preventing the deterioration of the second power supply 20.

[5. Inspection of Second System According to Embodiment]

Figure 7:
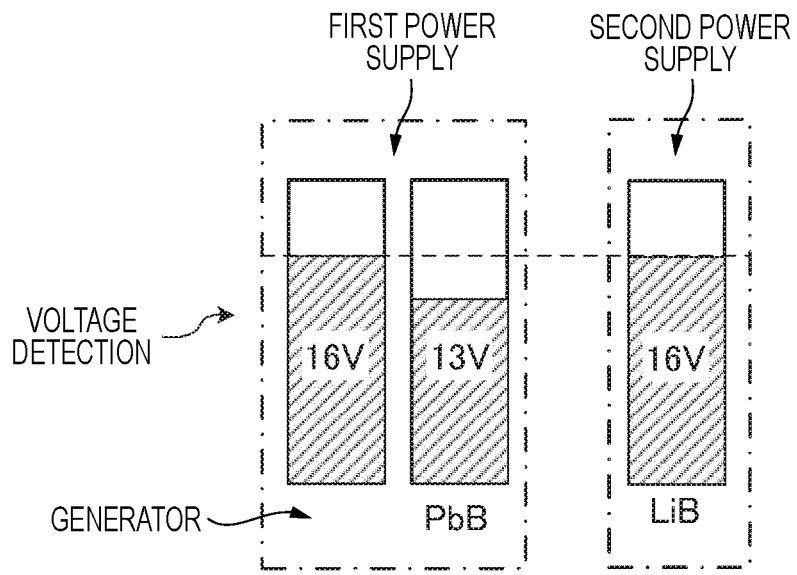
FIG. 7 is an illustrative diagram of an inspection method according to the embodiment.
Figure 7:
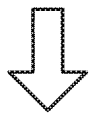
Figure 7:
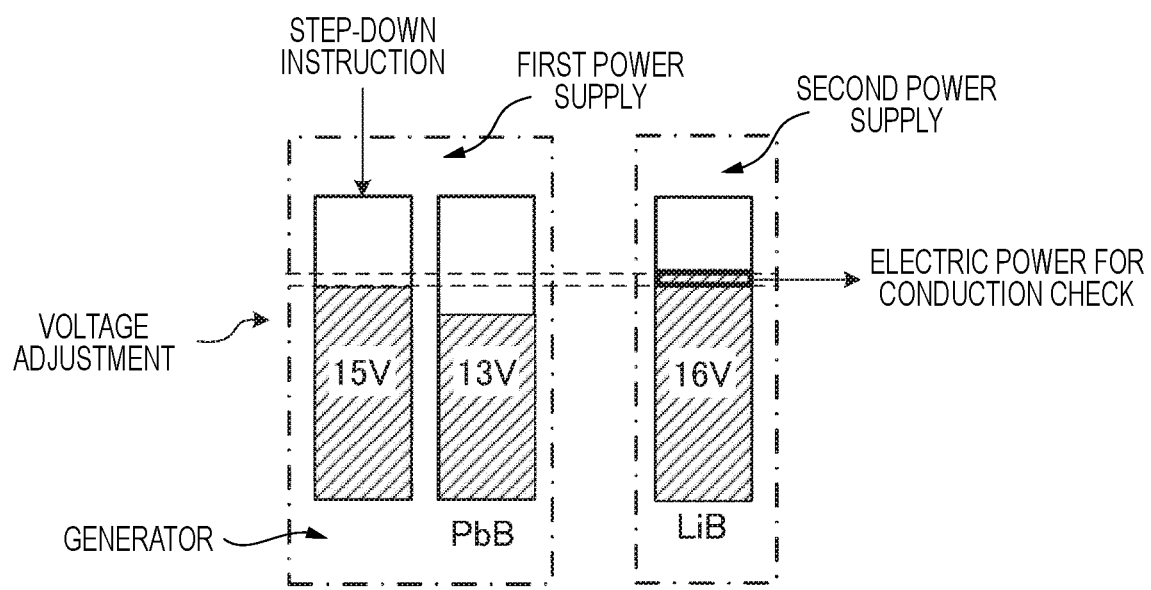

As illustrated in FIG. 7, the inspection unit 31 according to the embodiment first detects the voltages of the first power supply 10 and the second power supply 20 at a timing at which the detection does not interfere with the automated driving, such as at the time of activation or at the time of stopping. At this time, the voltage of the first power supply 10 is 16 (V) when the voltage of the generator 11 is 16 (V) and the voltage of the PbB 12 is 13 (V). The voltage of the second power supply 20 is 16 (V) when the voltage of the LiB 21 is 16 (V).

When the voltage of the first power supply 10 and the voltage of the second power supply 20 are equal to each other, the inspection unit 31 conducts the second system switch 42, controls the generator 11, and performs voltage adjustment to step up or step down the voltage of the first power supply 10. Thereafter, the inspection unit 31 inspects whether electric power can be supplied from the second power supply 20 to the first FOP load 101, the second FOP load 102, and the third FOP load 103.

Figure 8:
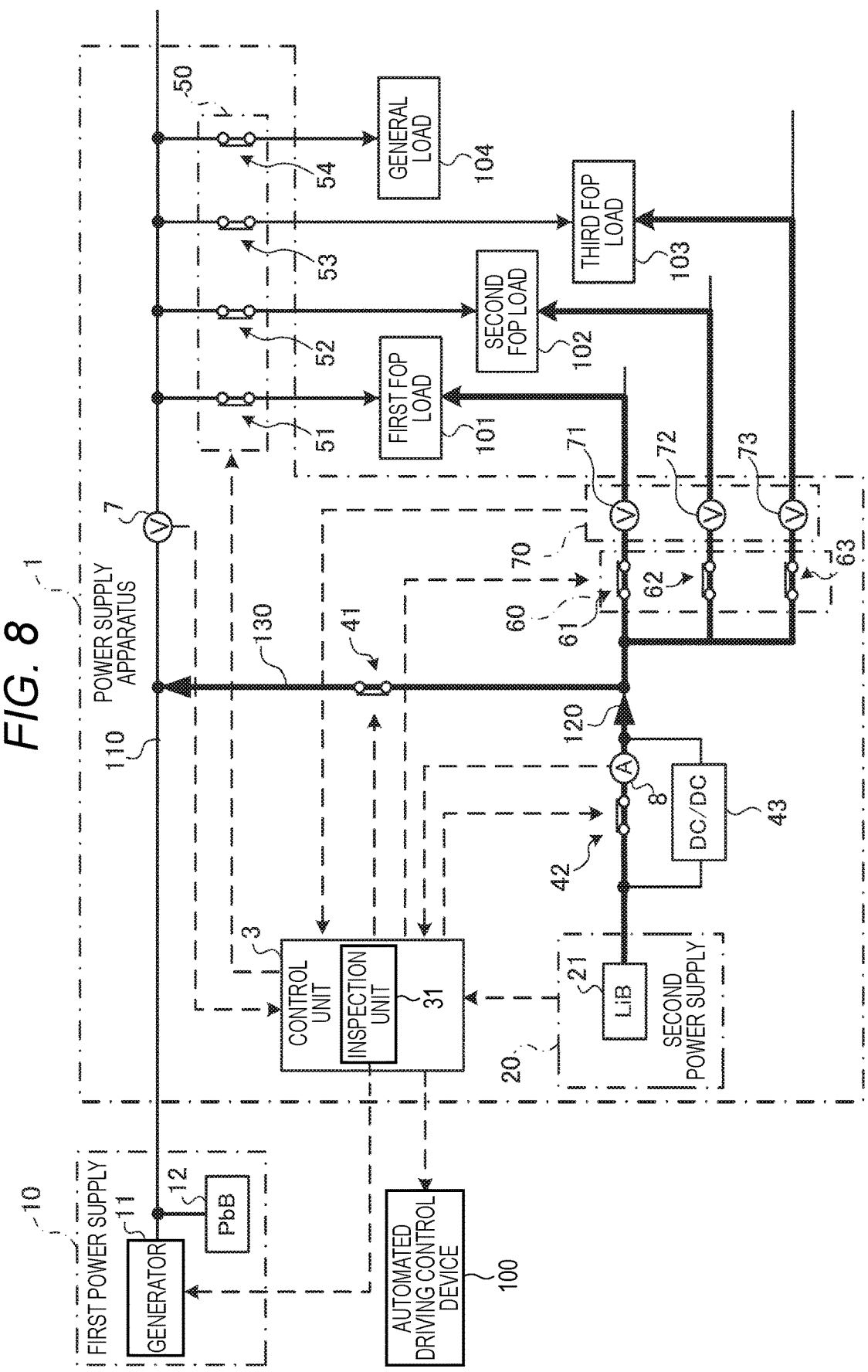
FIG. 8 is an illustrative diagram illustrating an operation example of the power supply apparatus according to the embodiment.

As illustrated in FIG. 8, for example, when the inspection unit 31 steps down the voltage of the first power supply 10 in the state where the second system switch 42 is conducted, the voltage of the first power supply 10 gradually becomes lower than the voltage of the second power supply 20. That is, a difference voltage between the first power supply 10 and the second power supply 20 gradually increases from 0, and a current corresponding to the difference voltage flows from the second power supply 20 to the second system 120. This current gradually increases from 0 according to the difference voltage.

Therefore, the inspection unit 31 can detect, by the current sensor 8, a minute current when the current starts to flow from the second power supply 20 to the second system 120 as a current for conduction check. When the conduction check is completed, the inspection unit 31 stops the stepping down of the first power supply 10.

Therefore, when the minimum necessary current discharged from the second power supply 20 is detected by the current sensor 8 immediately after the voltage of the first power supply 10 equal to the voltage of the second power supply 20 is stepped down, the inspection unit 31 determines that the second system switch 42 is not fixed to the off-state and the backup can be performed.

Further, when the current sensor 8 does not detect the current discharged from the second power supply 20 immediately after the voltage of the first power supply 10 equal to the voltage of the second power supply 20 is stepped down, the inspection unit 31 determines that the second system switch 42 is fixed to the off-state and the backup cannot be performed.

In this manner, since the inspection unit 31 performs the inspection of the backup availability determination by discharging the minimum necessary current from the second power supply 20, it is possible to perform the inspection as to whether electric power can be supplied from the second power supply 20 to the second system 120 while preventing the deterioration of the second power supply 20.

Further, for example, when the inspection unit 31 steps up the voltage of the first power supply 10 in the state where the second system switch 42 is conducted, the voltage of the first power supply 10 gradually becomes larger than the voltage of the second power supply 20. That is, the difference voltage between the first power supply 10 and the second power supply 20 gradually increases from 0, and a current corresponding to the difference voltage flows from the first power supply 10 to the second power supply 20 as a charging current. This current gradually increases from 0 according to the difference voltage.

Figure 9:
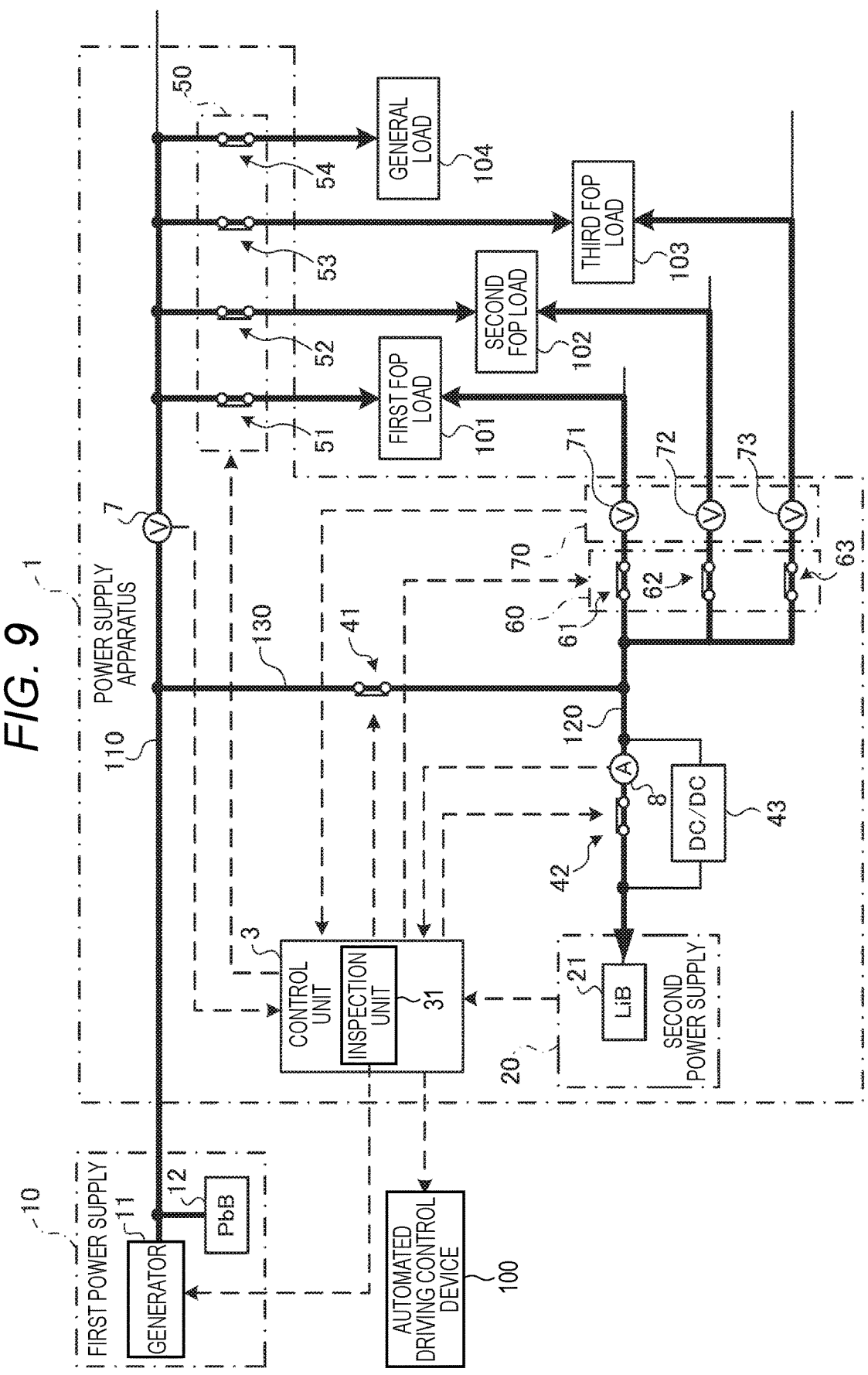
FIG. 9 is an illustrative diagram illustrating an operation example of the power supply apparatus according to the embodiment.

Therefore, as illustrated in FIG. 9, the inspection unit 31 can detect, by the current sensor 8, a minute current when the current starts to flow from the first power supply 10 to the second power supply 20 as a charging current for conduction check. When the conduction check is completed, the inspection unit 31 stops the stepping up of the first power supply 10.

Therefore, when a minimum necessary charging current flowing from the first power supply 10 to the second power supply 20 is detected by the current sensor 8 immediately after the voltage of the first power supply 10 is stepped up, the inspection unit 31 determines that the second system switch 42 is not fixed to the off-state and the backup can be performed.

Further, when the current sensor 8 does not detect the current flowing from the first power supply 10 to the second power supply 20 immediately after the voltage of the first power supply 10 is stepped up, the inspection unit 31 determines that the second system switch 42 is fixed to the off-state and the backup cannot be performed.

In this manner, since the inspection unit 31 performs the inspection of the backup availability determination by charging the minimum necessary current in the second power supply 20, it is possible to perform the inspection as to whether electric power can be supplied from the second power supply 20 to the second system 120 while preventing the deterioration of the second power supply 20.

Figure 10:
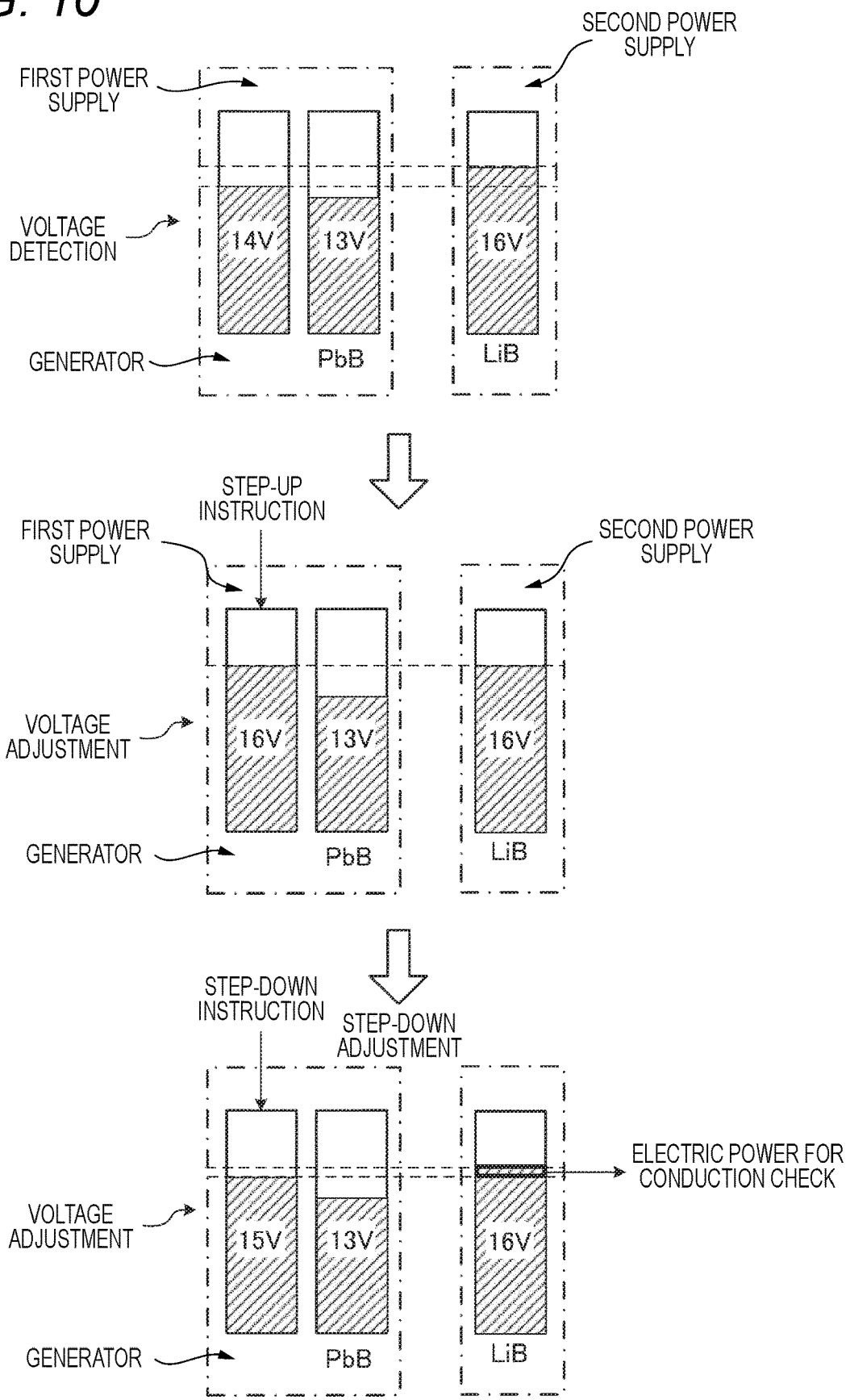
FIG. 10 is an illustrative diagram of an inspection method according to the embodiment.

As illustrated in FIG. 10, when the voltages are detected, the voltage of the first power supply 10 and the voltage of the second power supply 20 may not be equal to each other. For example, when the voltage of the first power supply 10 is lower than the voltage of the second power supply 20, the inspection unit 31 steps up the voltage of the first power supply 10 while disconnecting the second system switch 42, and performs the voltage adjustment such that the voltage of the first power supply 10 and the voltage of the second power supply 20 become equal to each other.

Thereafter, the inspection unit 31 conducts the second system switch 42, steps down the voltage of the first power supply 10, and inspects whether electric power can be supplied from the second power supply 20 to the first FOP load 101, the second FOP load 102, and the third FOP load 103.

Accordingly, since the inspection unit 31 can create a same state as the state illustrated in FIG. 8, by discharging the minimum necessary current from the second power supply 20, it is possible to perform the inspection as to whether electric power can be supplied from the second power supply 20 to the second system 120 while preventing the deterioration of the second power supply 20.

The inspection unit 31 may perform the voltage adjustment so that the voltage of the first power supply 10 and the voltage of the second power supply 20 become equal to each other, then conduct the second system switch 42, step up the voltage of the first power supply 10, and inspect whether electric power can be supplied from the second power supply 20 to the second system 120.

Accordingly, since the inspection unit 31 can create a same state as the state illustrated in FIG. 9, by charging the minimum necessary charging current to the second power supply 20, it is possible to perform the inspection as to whether electric power can be supplied from the second power supply 20 to the second system 120 while preventing the deterioration of the second power supply 20.

Figure 11:
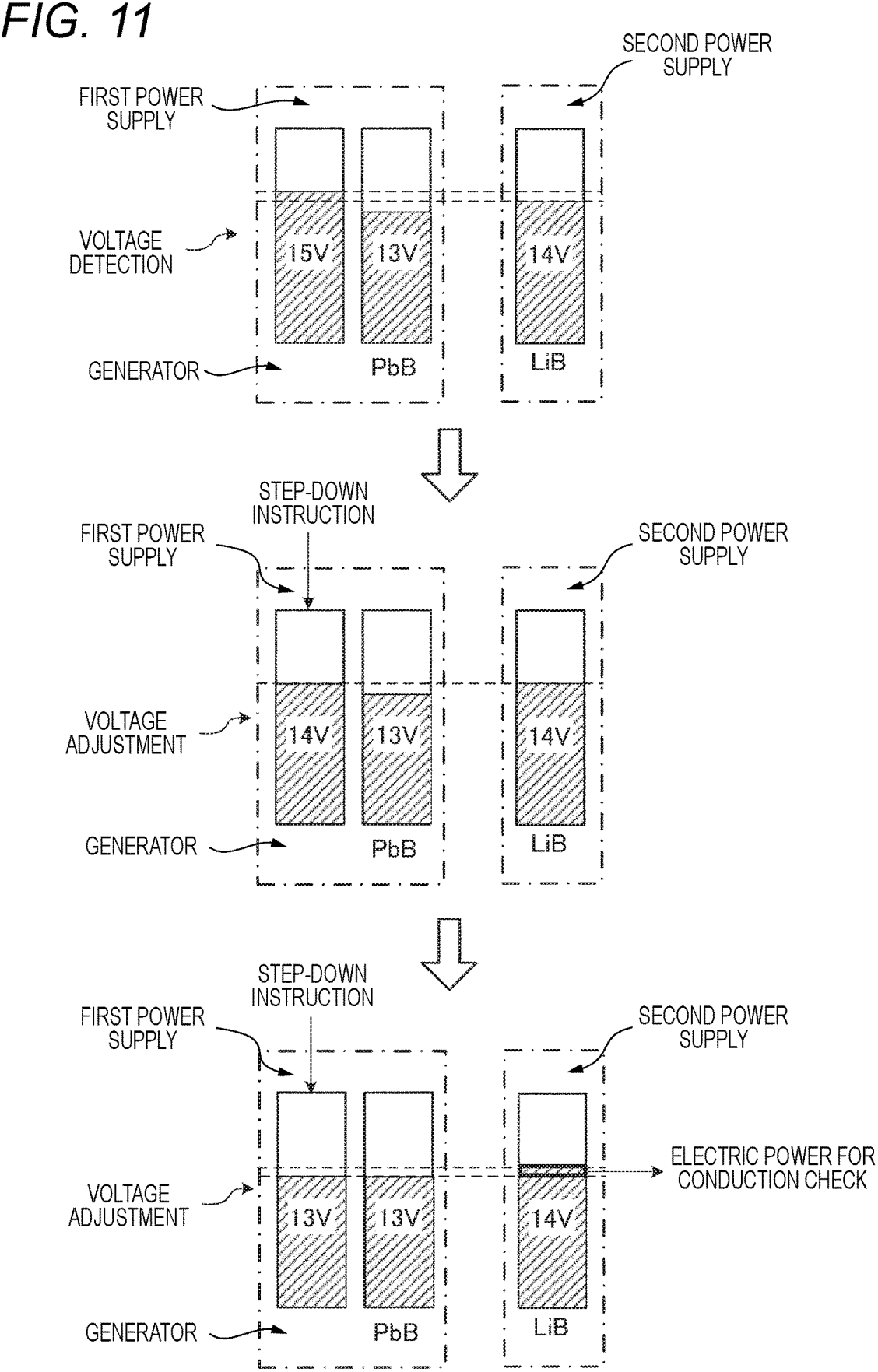
FIG. 11 is an illustrative diagram of an inspection method according to the embodiment.

As illustrated in FIG. 11, when the voltages are detected, the voltage of the first power supply 10 may be higher than the voltage of the second power supply 20. In this case, when the voltage of the LiB 21 is higher than the voltage of the PbB 12, the inspection unit 31 steps down the voltage of the generator 11 and performs the voltage adjustment so that the voltage of the first power supply 10 and the voltage of the LiB 21 become equal to each other.

Thereafter, the inspection unit 31 conducts the second system switch 42, steps down the voltage of the first power supply 10, and inspects whether electric power can be supplied from the second power supply 20 to the first FOP load 101, the second FOP load 102, and the third FOP load 103. At this time, the inspection unit 31 may conduct the second system switch 42, step up the voltage of the first power supply 10, and inspect whether electric power can be supplied from the second power supply 20 to the first FOP load 101, the second FOP load 102, and the third FOP load 103.

Figure 12:
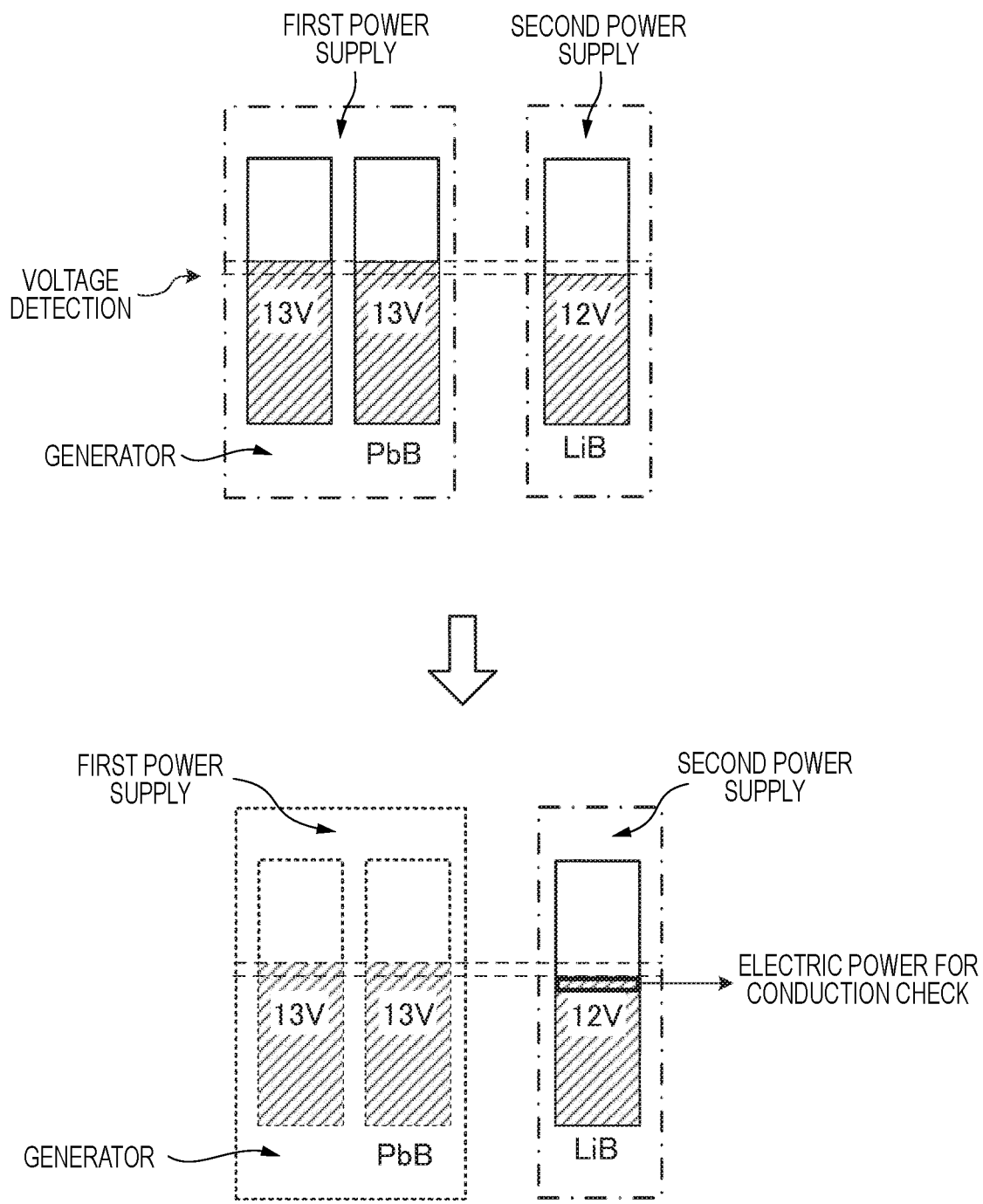
FIG. 12 is an illustrative diagram of an inspection method according to the embodiment.

As illustrated in FIG. 12, when the voltages are detected, the voltage of the LiB 21 may be lower than the voltage of the PbB 12. In this case, even when the inspection unit 31 controls the generator 11, the inspection unit 31 cannot step down the voltage of the first power supply 10 to the voltage of the second power supply 20.

Therefore, when the voltage of the LiB 21 is lower than the voltage of the PbB 12, the inspection unit 31 disconnects the connection unit 41 and then conducts the second system switch 42 in the same manner as the inspection method according to the comparative example illustrated in FIG. 6. Then, the inspection unit 31 inspects whether electric power can be supplied from the second power supply 20 to the first FOP load 101, the second FOP load 102, and the third FOP load 103.

[6. Process Executed by Inspection Unit]

Figure 13:
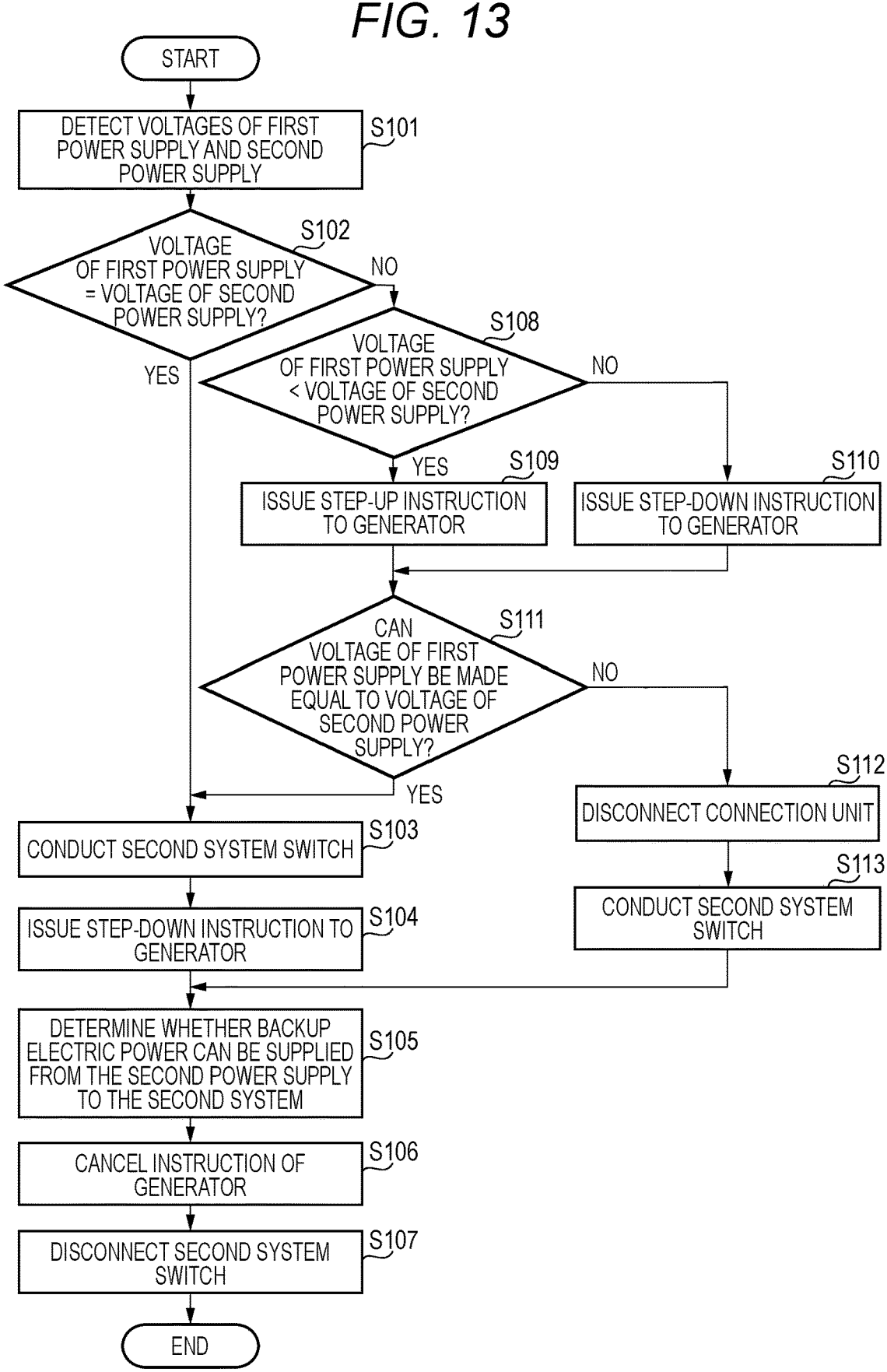
FIG. 13 is a flowchart illustrating an example of a process executed by an inspection unit according to the embodiment.

Next, a process executed by the inspection unit 31 will be described with reference to FIG. 13. FIG. 13 is a flowchart illustrating an example of the process executed by the inspection unit 31 according to the embodiment. The inspection unit 31 starts the process illustrated in FIG. 13 at a timing at which the process does not interfere with the automated driving, for example, at the time of activation or at the time of stopping. At this time, the connection unit 41 is conducted, and the second system switch 42 is disconnected.

As illustrated in FIG. 13, at an inspection timing, the inspection unit 31 first detects the voltages of the first power supply 10 and the second power supply 20 (step S101), and determines whether the voltage of the first power supply 10 and the voltage of the second power supply 20 are equal to each other (step S102).

When the inspection unit 31 determines that the voltage of the first power supply 10 and the voltage of the second power supply 20 are equal to each other (step S102, Yes), the inspection unit 31 conducts the second system switch 42 (step S103) and issues a step-down instruction to the generator 11 (step S104).

Then, the inspection unit 31 determines whether backup electric power can be supplied from the second power supply 20 to the second system 120 (step S105). At this time, when a current is detected by the current sensor 8, the inspection unit 31 determines that the backup electric power can be supplied. When the current sensor 8 does not detect the current, the inspection unit 31 determines that the backup electric power cannot be supplied. Thereafter, the inspection unit 31 cancels the instruction of the generator 11 to stop the generator 11 (step S106), disconnects the second system switch 42 (step S107), and ends the process.

When the inspection unit 31 determines in step S102 that the voltage of the first power supply 10 and the voltage of the second power supply 20 are not equal to each other (step S102, No), the inspection unit 31 determines whether the voltage of the first power supply 10 is lower than the voltage of the second power supply 20 (step S108).

When the inspection unit 31 determines that the voltage of the first power supply 10 is lower than the voltage of the second power supply 20 (step S108, Yes), the inspection unit 31 issues a step-up instruction to the generator 11 (step S109), and proceeds the process to step S111. Further, when the inspection unit 31 determines that the voltage of the first power supply 10 is higher than the voltage of the second power supply 20 (step S108, No), the inspection unit 31 issues the step-down instruction to the generator 11 (step S110), and proceeds the process to step S111.

In step S111, the inspection unit 31 determines whether the voltage of the first power supply 10 can be made equal to the voltage of the second power supply 20. When the inspection unit 31 determines that the voltage of the first power supply 10 can be equal to the voltage of the second power supply 20 (step S111, Yes), the inspection unit 31 proceeds the process to step S103.

When the inspection unit 31 determines that the voltage of the first power supply 10 cannot be equal to the voltage of the second power supply 20 (step S111, No), the inspection unit 31 disconnects the connection unit 41 (step S112), conducts the second system switch 42 (step S113), and proceeds the process to step S105. The above-described embodiment is an example, and various modifications are possible. Hereinafter, an inspection method and an example of a process executed by the inspection unit 31 according to a modification of the embodiment will be described.

[7. Inspection of Second System According to Modification of Embodiment]

The inspection unit 31 according to the modification controls the first power supply 10 such that the voltage of the first power supply 10 is equal to the voltage of the second power supply 20, and when a voltage difference between the first power supply 10 and the second power supply 20 is within a predetermined voltage difference, the inspection unit 31 conducts the second system switch 42. Then, the inspection unit 31 inspects whether electric power can be supplied from the second power supply 20 to the first FOP load 101, the second FOP load 102, and the third FOP load 103.

Figure 14:
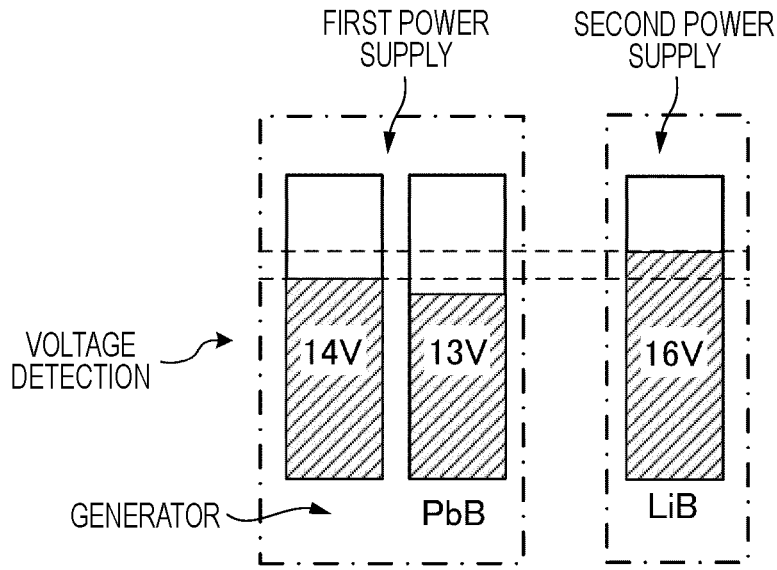
FIG. 14 is an illustrative diagram of an inspection method according to a modification of the embodiment.
Figure 14:
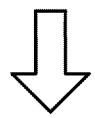
Figure 14:
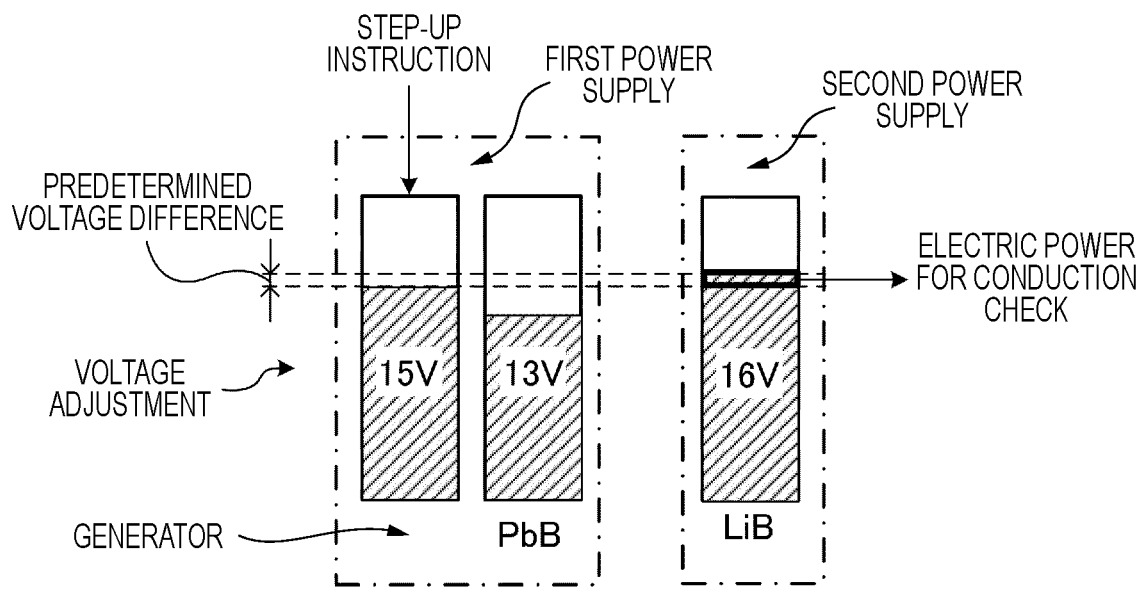

For example, as illustrated in FIG. 14, when the voltages are detected, if the voltage of the first power supply 10 is lower than the voltage of the second power supply 20, the inspection unit 31 issues the step-up instruction to the generator 11 so that the voltage of the first power supply 10 becomes equal to the voltage of the second power supply 20.

Then, when the voltage difference between the first power supply 10 and the second power supply 20 becomes equal to or less than the predetermined voltage difference before the voltage of the first power supply 10 becomes equal to the voltage of the second power supply 20, the inspection unit 31 cause the generator 11 to end the stepping up. At this time, the voltage of the first power supply 10 is lower than the voltage of the second power supply 20 by the predetermined voltage difference.

Therefore, the inspection unit 31 can discharge a small current from the second power supply 20 to the second system 120 by conducting the second system switch 42 in this state. Then, the inspection unit 31 can inspect whether electric power can be supplied from the second power supply 20 to the first FOP load 101, the second FOP load 102, and the third FOP load 103 based on whether the current sensor 8 detects the current.

Accordingly, the inspection unit 31 can inspect whether electric power can be supplied from the second power supply 20 to the second system 120 without stepping down the voltage of the first power supply 10 after stepping up the voltage of the first power supply 10 until the voltage of the first power supply 10 becomes equal to the voltage of the second power supply 20 once.

If the voltage of the first power supply 10 is higher than the voltage of the second power supply 20, the inspection unit 31 issues the step-down instruction to the generator 11 so that the voltage of the first power supply 10 becomes equal to the voltage of the second power supply 20. Then, when the voltage difference between the first power supply 10 and the second power supply 20 becomes equal to or less than the predetermined voltage difference before the voltage of the first power supply 10 becomes equal to the voltage of the second power supply 20, the inspection unit 31 cause the generator 11 to end the stepping down. At this time, the voltage of the first power supply 10 is higher than the voltage of the second power supply 20 by the predetermined voltage difference. Therefore, the inspection unit 31 can charge a small current from the first power supply 10 to the second power supply 20 by conducting the second system switch 42 in this state. Then, the inspection unit 31 can inspect whether electric power can be supplied from the second power supply 20 to the first FOP load 101, the second FOP load 102, and the third FOP load 103 based on whether the current sensor 8 detects the current.

[8. Process Executed by Inspection Unit According to Modification of Embodiment]

Figure 15:
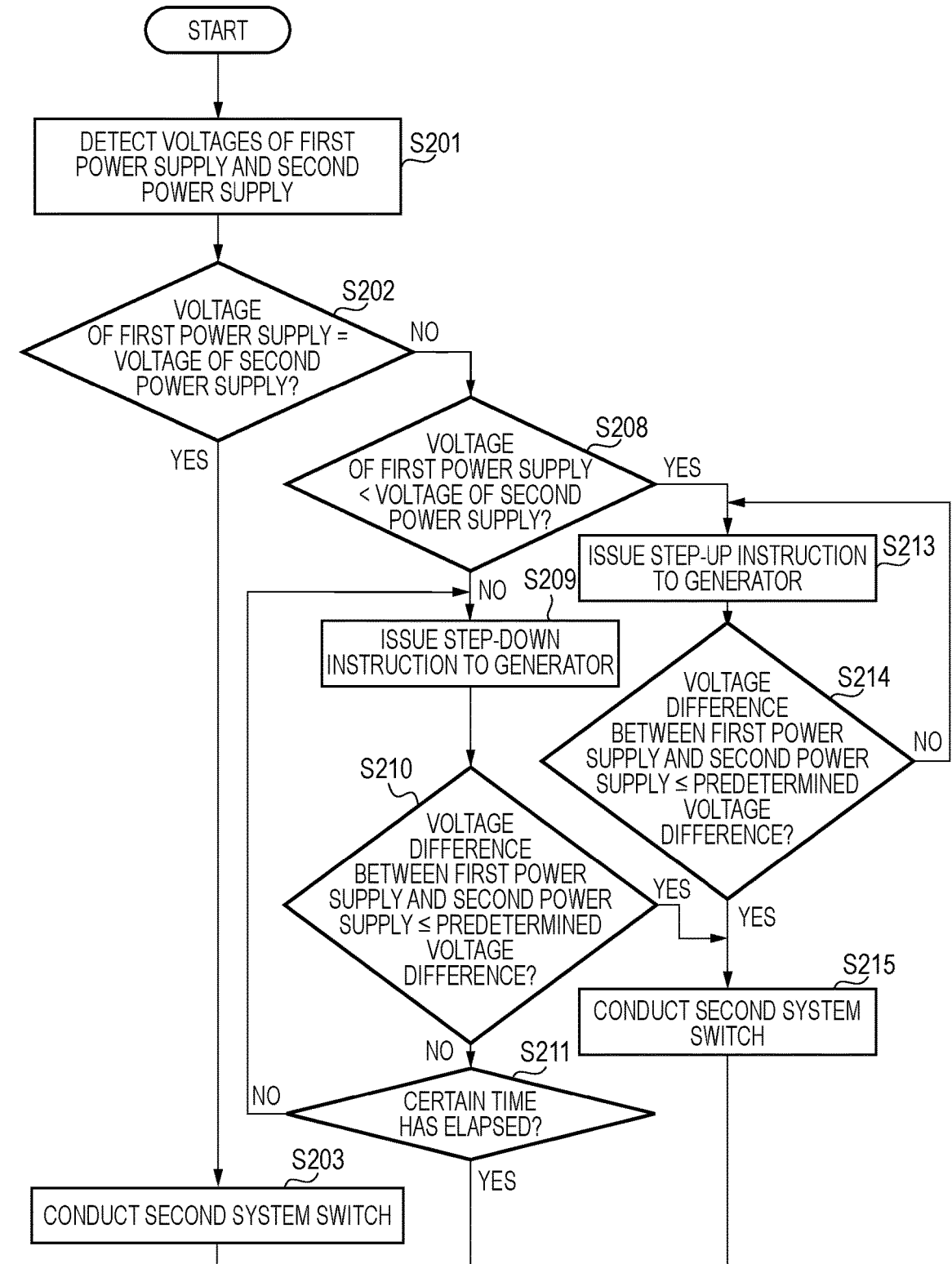
FIG. 15 is a flowchart illustrating an example of a process executed by an inspection unit according to the modification of the embodiment.

Next, a process executed by the inspection unit 31 according to a modification will be described with reference to FIG. 15. FIG. 15 is a flowchart illustrating an example of the process executed by the inspection unit 13 according to the modification of the embodiment.

As illustrated in FIG. 15, at the inspection timing, the inspection unit 31 first detects the voltages of the first power supply 10 and the second power supply 20 (step S201), and determines whether the voltage of the first power supply 10 and the voltage of the second power supply 20 are equal to each other (step S202).

When the inspection unit 31 determines that the voltage of the first power supply 10 and the voltage of the second power supply 20 are equal to each other (step S202, Yes), the inspection unit 31 conducts the second system switch 42 (step S203) and issues a step-down instruction to the generator 11 (step S204).

Then, the inspection unit 31 determines whether backup electric power can be supplied from the second power supply 20 to the second system 120 (step S205). Thereafter, the inspection unit 31 cancels the instruction of the generator 11 to stop the generator 11 (step S206), disconnects the second system switch 42 (step S207), and ends the process. The processing of steps S201 to S207 up to this point are the same as the processing of steps S101 to S107 shown in FIG. 13.

When the inspection unit 31 according to the modification determines in step S202 that the voltage of the first power supply 10 and the voltage of the second power supply 20 are not equal to each other (step S202, No), the inspection unit 31 determines whether the voltage of the first power supply 10 is lower than the voltage of the second power supply 20 (step S208).

When the inspection unit 31 determines that the voltage of the first power supply 10 is not lower than the voltage of the second power supply 20 (step S208, No), the inspection unit 31 issues the step-down instruction to the generator 11 (step S209), and determines whether the voltage difference between the first power supply 10 and the second power supply 20 is equal to or less than the predetermined voltage difference (step S210).

When the inspection unit 31 determines that the voltage difference between the first power supply 10 and the second power supply 20 is equal to or less than the predetermined voltage difference (step S210, Yes), the inspection unit 31 conducts the second system switch 42 (step S215), and proceeds the process to step S205. When the inspection unit 31 determines that the voltage difference between the first power supply 10 and the second power supply 20 is not equal to or less than the predetermined voltage difference (step S210, No), the inspection unit 31 determines whether a certain time has elapsed after the step-down instruction is issued in step S209 (step S211).

When the inspection unit 31 determines that the certain time has not elapsed (step S211, No), the inspection unit 31 returns the process to step S209. When the inspection unit 31 determines that the certain time has elapsed (step S211, Yes), the inspection unit 31 determines that the voltage of the PbB 12 is higher than the voltage of the LiB 21 by the predetermined voltage difference or more, determines that the voltage of the first power supply 10 cannot be stepped down any more, disconnects the connection unit 41 (Step S212), and proceeds the process to step S205.

When the inspection unit 31 determines that the voltage of the first power supply 10 is lower than the voltage of the second power supply 20 (step S208, Yes), the inspection unit 31 issues the step-up instruction to the generator 11 (step S213). Then, the inspection unit 31 determines whether the voltage difference between the first power supply 10 and the second power supply 20 is equal to or less than the predetermined voltage difference (step S214).

When the inspection unit 31 determines that the voltage difference between the first power supply 10 and the second power supply 20 is equal to or less than the predetermined voltage difference (step S214, Yes), the inspection unit 31 proceeds the process to step S215. Further, when the inspection unit 31 determines that the voltage difference between the first power supply 10 and the second power supply 20 is not equal to or less than the predetermined voltage difference (step S214, No), the inspection unit 31 proceeds the process to step S213.

Additional effects and modifications can be easily derived by those skilled in the art. Therefore, broader aspects of the present invention are not limited to the specific details and the representative embodiments shown and described above. Therefore, various modifications can be made without departing from the spirit or scope of the general inventive concept as defined by the appended claims and equivalents of the claims.

REFERENCE SIGNS LIST 1 power supply apparatus
10 first power supply
11 generator
12 PbB
20 second power supply
21 LiB
3 control unit
31 inspection unit
41 connection unit
42 second system switch
43 DC/DC
50 first connection device
60 second connection device
51 to 54, 61 to 63 switch
7 first voltage sensor
70 second voltage sensor
71 to 73 voltage sensor
8 current sensor
100 automated driving control device
101 first FOP load
102 second FOP load
103 third FOP load
104 general load
110 first system
120 second system
130 inter-system line

What is claimed is:

1. A power supply apparatus comprising:
a first system configured to supply electric power of a first power supply to a first load;
a second system configured to supply electric power of a second power supply to a second load;
a connector which is capable of connecting and disconnecting the first system and the second system;
a second system switch which is capable of connecting the second power supply to the second system; and
at least one processor configured to perform inspection as to whether electric power is capable of being supplied from the second power supply to the second load,
wherein when a voltage of the second power supply is not equal to a voltage of the first power supply, the at least one processor controls the first power supply so that the voltage of the first power supply becomes equal to the voltage of the second power supply, and after the controlling, conducts the second system switch to perform the inspection by stepping down or stepping up the voltage of the first power supply.

2. The power supply apparatus according to claim 1, wherein when the voltage of the first power supply and the voltage of the second power supply are equal to each other, the at least one processor conducts the second system switch, and performs the inspection by stepping down or stepping up the voltage of the first power supply.

3. The power supply apparatus according to claim 1, wherein when the voltage of the first power supply and the voltage of the second power supply cannot be equal to each other, the at least one processor disconnects the connector, and conducts the second system switch to perform the inspection.

4. The power supply apparatus according to claim 2, wherein when the voltage of the first power supply and the voltage of the second power supply cannot be equal to each other, the at least one processor disconnects the connector, and conducts the second system switch to perform the inspection.

5. A power supply apparatus comprising:
a first system configured to supply electric power of a first power supply to a first load;
a second system configured to supply electric power of a second power supply to a second load;
a connector which is capable of connecting and disconnecting the first system and the second system;
a second system switch which is capable of connecting the second power supply to the second system; and
at least one processor configured to perform inspection as to whether electric power is capable of being supplied from the second power supply to the second load,
wherein the at least one processor controls the first power supply so that a voltage of the first power supply is equal to a voltage of the second power supply, and when a voltage difference between the first power supply and the second power supply becomes to be within a predetermined voltage difference, the at least one processor conducts the second system switch to perform the inspection.

6. An inspection method of a power supply apparatus, the power supply apparatus including a first system configured to supply electric power of a first power supply to a first load, a second system configured to supply electric power of a second power supply to a second load, a connector which is capable of connecting and disconnecting the first system and the second system, a second system switch which is capable of connecting the second power supply to the second system, and at least one processor configured to perform inspection as to whether electric power is capable of being supplied from the second power supply to the second load, and the inspection method comprising:
when a voltage of the second power supply is not equal to a voltage of the first power supply, the at least one processor controlling the first power supply so that the voltage of the first power supply becomes equal to the voltage of the second power supply, and after the controlling, conducting the second system switch to perform the inspection by stepping down or stepping up the voltage of the first power supply.

7. An inspection method of a power supply apparatus, the power supply apparatus including a first system configured to supply electric power of a first power supply to a first load, a second system configured to supply electric power of a second power supply to a second load, a connector which is capable of connecting and disconnecting the first system and the second system, a second system switch which is capable of connecting the second power supply to the second system, and at least one processor configured to perform inspection as to whether electric power is capable of being supplied from the second power supply to the second load, and the inspection method comprising:

the at least one processor controlling the first power supply so that a voltage of the first power supply is equal to a voltage of the second power supply, and when a voltage difference between the first power supply and the second power supply becomes to be within a predetermined voltage difference, the at least one processor conducting the second system switch to perform the inspection.

* * * * *